US012562588B2

(12) United States Patent
Thiel et al.

(10) Patent No.: US 12,562,588 B2
(45) Date of Patent: Feb. 24, 2026

(54) METHOD FOR SETTING A POWER CLASS OF AN INVERTER, AND INVERTER

(71) Applicant: SMA Solar Technology AG, Niestetal (DE)

(72) Inventors: Raimund Thiel, Bad Zwesten (DE); Michael Viotto, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 517 days.

(21) Appl. No.: 18/108,840

(22) Filed: Feb. 13, 2023

(65) Prior Publication Data

US 2023/0187967 A1      Jun. 15, 2023

Related U.S. Application Data

(63) Continuation of application No. PCT/EP2021/074017, filed on Aug. 31, 2021.

(30) Foreign Application Priority Data

Aug. 31, 2020    (DE) ..................... 10 2020 122 705.1

(51) Int. Cl.
        *H02J 13/00*        (2006.01)
        *G06V 10/94*        (2022.01)
                (Continued)

(52) U.S. Cl.
        CPC .............. *H02J 13/00* (2013.01); *G06V 10/95* (2022.01); *G06V 40/10* (2022.01); *H04L 9/32* (2013.01)

(58) Field of Classification Search
        CPC . H02J 13/00; H02J 3/38; G06V 10/95; G06V 40/10; H04L 9/32; H02M 1/0025; Y02E 10/56
        See application file for complete search history.

(56) References Cited

U.S. PATENT DOCUMENTS 4,755,850 A  *  7/1988  Suzuki ................. G03G 15/065
                                                                399/48
5,946,210 A  *  8/1999  Montminy .............. G06F 30/00
                                                                700/32

(Continued)

FOREIGN PATENT DOCUMENTS

DE        102015101684 A1      9/2015
DE        102014226620 A1      6/2016
EP            3438009 A1      2/2019

OTHER PUBLICATIONS

International Search Report dated Jan. 26, 2022 for International Application No. PCT/EP2021/074017.

*Primary Examiner* — Ziaul Karim
(74) *Attorney, Agent, or Firm* — Eschweiler & Potashnik, LLC

(57)                ABSTRACT

The disclosure relates to a method for setting a power class of an inverter, wherein the inverter has a device type plate containing information about the inverter which is device-specific and independent of the selected power class, and wherein the inverter has a class plate which is selected from a plurality of power class-specific class plates each assigned to one power class from a plurality of power classes and contains information about the assigned power class. The method includes capturing an image of the device type plate and the class plate and reading out the device-specific information and the information about the assigned power class from the data captured as an image, —transferring a setting sequence to the inverter, wherein the setting sequence has the information about the assigned power class, —setting the power class of the inverter using the setting sequence following authentication of the read-out information. The disclosure also relates to an inverter having a power class that can be set.

13 Claims, 3 Drawing Sheets

(51) Int. Cl.
    *G06V 40/10*        (2022.01)
    *H04L 9/32*         (2006.01)

(56)             References Cited

U.S. PATENT DOCUMENTS

| | | | | |
|---|---|---|---|---|
| 6,256,732 B1 * | 7/2001 | Cromer | G06F 1/181 | |
| | | | 53/428 | |
| 2011/0102148 A1 * | 5/2011 | Laffey | H04L 41/082 | |
| | | | 340/10.1 | |
| 2013/0086373 A1 * | 4/2013 | Rothkopf | G06F 9/445 | |
| | | | 53/266.1 | |
| 2013/0342704 A1 * | 12/2013 | Williams | G06F 3/0354 | |
| | | | 348/838 | |
| 2015/0256355 A1 * | 9/2015 | Pera | H04L 12/2816 | |
| | | | 700/90 | |
| 2016/0159088 A1 * | 6/2016 | Sano | B41J 2/04593 | |
| | | | 347/68 | |
| 2019/0033804 A1 * | 1/2019 | Handelsman | G06Q 10/087 | |
| 2019/0246463 A1 * | 8/2019 | Williams | H05B 45/397 | |

* cited by examiner

Fig. 3
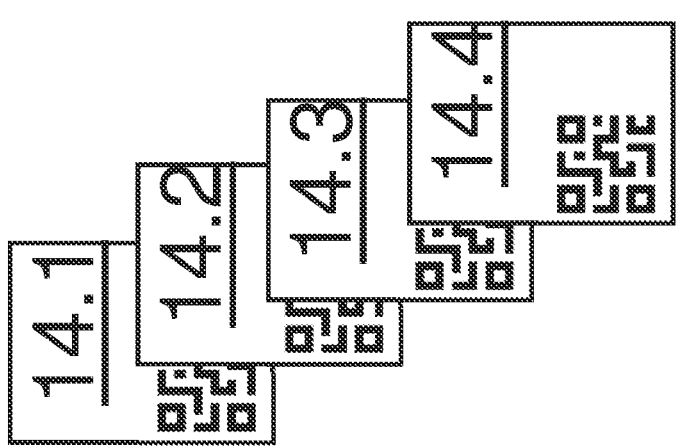
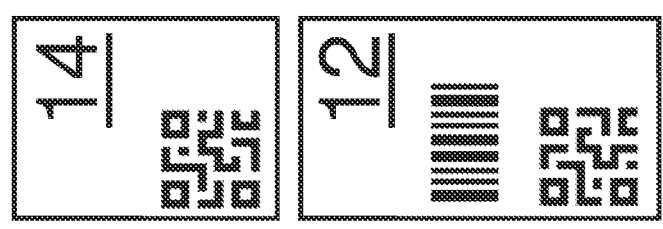

METHOD FOR SETTING A POWER CLASS OF AN INVERTER, AND INVERTER

REFERENCE TO RELATED APPLICATIONS

This Application is a Continuation of International Application number PCT/EP2021/074017, filed on Aug. 31, 2021, which claims the benefit of German Application number 10 2020 122 705.1, filed on Aug. 31, 2020. The contents of the above-referenced Patent Applications are hereby incorporated by reference in their entirety.

FIELD

The disclosure relates to a method for setting a power class of an inverter, and to an inverter.

BACKGROUND

Inverters are power electronic devices configured to convert DC voltage into AC voltage, and vice versa. The inverters of a specific type are generally available in different power classes. Inverters of different power classes are designed for different powers. The selection of an inverter with appropriate power for a specific application is thus simplified.

Inverters can convert e.g. the DC voltage from solar modules into AC voltage for feeding into a power supply grid. The inverter, also called a PV inverter, is thus part of a photovoltaic installation (PV installation). In this case, a PV installation can have a plurality of PV generators. By virtue of different power classes being made available, it is possible to fulfil a customer requirement for an inverter with appropriate power for different PV installations and/or PV generators.

For simple organization of production and component procurement, however, a minimum number of different variants of inverters of a specific type is desired, under certain circumstances. The customer requirement for the largest possible selection of power classes may thus be at odds which affect device production. This problem can be solved e.g. by the device power being defined as late as possible in production or optionally later during installation or commissioning. In this case, the inverters of one type may be substantially or completely identical from a technical standpoint and differ by virtue of the power setting, e.g. by virtue of software, and the type plate corresponding to the power set. Setting the power and attaching the type plate can be carried out at the end of production, such that most production steps can proceed identically for all power classes.

For stock-keeping on the part of the manufacturer, the wholesaler and/or the installer, the devices may furthermore exist in different power classes. The advantages afforded by the power classes being technically identical are thus predominantly utilized in production. The reason for this is the device power being defined at the end of production. Deferring the power setting to the time of installation would mean a further simplification of the logistics for the wholesaler, the installation and the manufacturer.

Safety standards for PV inverters demand that a type plate specifies the power and variables dependent thereon, such as the maximum grid current. The power of the device is essential for the design of the lines and fuses in the installation and furthermore a basis for the permission to feed into the grid granted by the grid operator. It is therefore necessary to ensure that even when the power is defined at the time of installation, the power specification on the type plate matches the actual power of the device. Protection against misuse is also required in this case.

The document DE 10 2015 101 684 A1 proposes the use of RFID tags as part of a variable type plate. The power is encoded in the RFID sticker and corresponds to the imprint. The sticker is attached during installation. The inverter contains an RFID reader, which, each time operation is started, reads out the data of the RFID sticker and sets the power read out. This ensures that the power indicated on the type plate matches the actual power of the device.

One disadvantage of this method is the technical outlay for the RFID reader integrated in the inverter. Furthermore, the use of this technology limits the choice of the housing material. RFID is based on radio and the housing must not have a shielding effect for the RFID communication frequency.

The document EP 3 438 009 A1 discloses a method in which an already packaged inverter can be commissioned by a type plate and a device for configuring the inverter after installation being enclosed with the packaging.

Furthermore, the document DE 10 2014 226 620 A1 discloses an electrohydraulic drive in which an attached type identifier is read out using a smartphone, and a set of parameters uniquely assigned to the type identifier for the operation of the drive is communicated thereto. The aim is to prevent an erroneous transmission of parameters and damage caused thereby.

SUMMARY

The disclosure is based on an object of efficiently handling the setting of the power class of inverters.

An inverter has a device type plate containing device-specific information of the inverter, which information is independent of the selected power class. The inverter additionally has a class plate which is selected from a plurality of power class-specific class plates each assigned to one power class from a plurality of power classes. The class plate contains information about the power class assigned to the inverter. In this case, the assigned power class is the power class to which the inverter is intended to be set.

The method for setting the power class of the inverter comprises capturing the device type plate and the class plate in image form and reading out the device-specific information and the information about the assigned power class from the data captured as an image, i.e. from the captured image or from the captured images, communicating a setting sequence to the inverter, wherein the setting sequence has the information about the assigned power class, and setting the power class of the inverter on the basis of the setting sequence after authentication of the information read out.

In one embodiment, the device type plate and the class plate are captured in image form jointly, i.e. with one optical recording. The image capture can be effected, for example, by way of a camera of a mobile device, e.g. of a smartphone or other type of reading device.

In one embodiment, the inverter has a controller, which controls power electronic switches enabling the input-side DC voltage to be converted into AC voltage, or vice versa. In one embodiment, the controller is configured to set the power class of the inverter after the setting sequence has been received, for example, using a software configuration of the program code that is executable on the computing device of the controller.

The setting sequence can be communicated to the inverter acoustically, mechanically, optically, directly electrically or by other means, for example, wirelessly. Examples of possible transmission means are: RFID, camera in the inverter, barcode scanner in the inverter, microphone, vibration sensor, photodiode, Bluetooth, WLAN, Ethernet, RS485, USB stick, memory card, etc. The communication of the setting sequence to the inverter is effected in one embodiment after checking whether a combination of the device-specific information and the information about the assigned power class is a permissible combination.

The disclosure makes it possible to set, for example, permanently set, a setting of the power class of an inverter, selected from a plurality of power classes in which the inverter is operable, during installation such that it is ensured that the set power class corresponds in a standard-conforming manner to the unique specifications of labeling attached to the inverter. This is done using a two-part plate for the inverter. The two-part plate comprises a device type plate as one part and a class plate as the other part. The device type plate is, in one embodiment, attached permanently during production. It contains all non-power-variable information about the inverter, for example, also in human-readable form, e.g. plain text. Furthermore, the device type plate contains a visually readable code, for example, a code that is visually readable by a computer, e.g. a QR code or barcode, which identifies the device. The identification of the device can comprise e.g. the serial number and/or the type designation.

The class plate comprises power-variable information of the inverter and is, in one embodiment, enclosed with the inverter in a plurality of variants. The information of the class plate is able to be read out in image form, e.g. in the form of a QR code, and comprises information about the power class of the inverter. In this case, for example, the power-variable information of the class plate is additionally also present in human-readable form, e.g. in plain text.

The class plate is, in one embodiment, attached to the inverter during installation. In one embodiment, the reading out in image form can be preceded by selecting the class plate from the plurality of class plates and attaching, for example, permanently attaching, the class plate to the inverter. These acts of selecting and attaching can be effected, for example, during installation of the inverter and before the commissioning thereof by the installer. The class plate can be attached, for example, by the class plate being stuck on. Permanent attachment is understood to mean that the plate cannot be detached again without being destroyed.

The method can ensure that the inverter with the labeling comprising a class plate which specifies a specific power actually complies with this power. The proposed solution is safer than the setting carried out by the installer since it better ensures that the power on the type plate matches the actual power. The situation where the installer attaches an incorrect sticker and thus inadvertently produces a device that is not normatively approved is avoided. Moreover, it may be possible to ensure that a PV installation to which the inverter may belong matches the specifications with which it was registered with the grid operator.

The information read out in image form is authenticated according to the disclosure before the power class of the inverter is set. In this context, authenticating means, in one embodiment, that the correct origin and/or the correctness of the content are/is checked. The authenticating can be checked e.g. using cryptographic methods, e.g. using of an app, by the checking of a signature of the information read out in image form. By way of example, it is possible for the setting sequence to be generated only after the authentication. The authenticating can optionally comprise a query of a database via a remote data connection, where the information captured in image form can be checked e.g. using a database query. The database can have, for example, a list of permissible combinations of device-specific information and information about the assigned power class, thus making it possible to ensure that an impermissible combination of type plate and class plate is recognized, in which case no setting sequence is generated.

In one embodiment, the setting sequence has additional security features which cannot be deduced, or cannot be directly deduced, from the device type plate and the class plate. The inverter can, in one embodiment, check these security features. The security features can be used, for example, for the authentication and comprise e.g. an encryption and/or signature. This further increases the security.

In the case of a successful authentication, the setting sequence can then be transmitted with an authentication section, an inverter identification section and a power class section to the inverter, wherein the inverter checks the authentication section and the inverter identification section before a power class contained in the power class section is set, for example, set permanently. In this case, the authentication section can contain in particular a signature that is checked by the inverter.

In one embodiment, the setting sequence, before being communicated to the inverter, is generated from the device-specific information and the information about the assigned power class. The generation can be effected e.g. on the same device used to capture the device type plate and the class plate in image form. Alternatively or additionally, the setting sequence can be generated in a control center which, via a remote data connection, e.g. via the Internet and/or mobile radio, has a communication relationship with the device used to carry out the image capture. A control center may be, for example, a computing center which is operated by the manufacturer of the inverter and, in one embodiment, has a database and is arranged e.g. in the cloud. In one development, the mobile device, e.g. smartphone, can communicate the data and, in the control center, e.g. an encrypted and/or signed device-specific setting sequence can be generated on the basis of knowledge of a non-public secret. In one embodiment, access to the facilities of the control center is possible only after previously ascertained identity and authorization. Alternatively or additionally, the encrypted and/or signed setting sequence can be generated directly on the mobile device.

In one embodiment, the inverter comprises structures for preventing the manipulation of the attached class plate. This can be done e.g. by the class plate being mechanically attached on the inverter in such a way that removal would lead to visible damage. A manipulation is thus recognizable. Such mechanical attachment can be effected e.g. using non-detachable latching hooks. It can also be effected by virtue of the fact that specifications concerning all power classes are already situated on the device type plate and those which are not applicable are removed, e.g. by being broken off at predetermined breaking points. It can also be effected by virtue of the fact that specifications concerning all power classes are already situated on the device type plate and those which are not applicable are covered, e.g. by covering plates with non-detachable latching hooks.

Advantageously, in one embodiment the capturing in image form is effected on a mobile device equipped with cryptographic functions. This can be realized e.g. by the use of a smartphone with an app and cryptography. As a result, it is possible to prevent misuse if, as in countries, for example, the requirements in respect of inverters and the costs for grid access increase with the power of inverters. Moreover, an unauthorized increase in the power can be prevented. For example, the intention is to prevent an unauthorized increase in the power after acceptance of the installation by the grid operator.

In one embodiment, after the inverter has been installed and the class plate has been attached, the installer scans e.g. the codes of device type plate and class plate with the app using the camera of his/her smartphone. The app checks that both parts of the type plate are present and are situated in the correct position with respect to one another. In one embodiment, from the information about the inverter type on the device type plate and the information concerning the power class on the class plate, the app can then generate the encrypted, secured setting sequence, which is checkable for validity by the inverter, for the purpose of power activation for the inverter and sends this to the inverter. The inverter checks this setting sequence and sets the corresponding power in the event of successful checking. In one embodiment, the power is set permanently, which means that it can be changed again only by the manufacturer and not by the user or installation operator. This makes it possible to ensure that the power on the plate corresponds to the actual power of the inverter.

In one embodiment, the inverter reports back to the sender of the setting sequence the successful setting of the power. It is likewise possible to report back the fact that a power was not set successfully, in which case, if appropriate, the reason for the lack of success may additionally be communicated.

In one embodiment of the disclosure, the capturing in image form and the transmitting of the setting sequence are effected by one and the same device, for example, the mobile device, such as a smartphone. Easy handle-ability is ensured as a result.

One embodiment can comprise checking the state of the structures for preventing the manipulation in the captured image. By way of example, the structures for preventing the manipulation of the attached class plate on the inverter can be recognized on the mobile device. By way of example, the app can be designed to recognize an incorrectly attached class plate which was protected against manipulation e.g. by means of abovementioned mechanical measures on the inverter. By way of example, the generation of the setting sequence can be omitted if checking the state of the structures in the captured image reveals that a manipulation has taken place.

In one embodiment, the authenticating can comprise capturing and checking information about the person conducting the capturing in image form. By way of example, information about the conducting person can be captured and a check can be made to establish whether the person is authorized. Information about the conducting person may be e.g. capture of an image of the person or e.g. the reading of an authorization card. By way of example, the generation of the setting sequence can be linked thereto and take place only if the person was identified as an authorized person.

In one embodiment, the authenticating can comprise checking whether there are preconditions for setting the power class of the inverter. The generation of the setting sequence would advantageously take place only after the validation of a contractual relationship. Such a validation could be effected by a query in a remote database and e.g. comprise: payment is made, a valid framework contract exists, authorization for activation is present, etc. For validation purposes, this information could be linked with information about the requesting entity, e.g. the identity of the PV installation, the role of the requesting entity and/or the identity thereof or the like. In particular, it is also possible to check whether the power class to be set corresponds to the one ordered and thus paid for. During the generation of the setting sequence in the control center with a database, payment for the set power can be checked. If the price for an inverter is dependent on the power and the payment for the set power, this can be checked before the enabling thereof and before the generation of the setting code. A further code can be used for this purpose, which further code is communicated to the inverter by the control center e.g. by way of remote data transmission. All this can be concomitantly checked in association with checking the permissibility of the combination of device-specific information and information about the assigned power class. In one variant of the method, upon the generation of the setting sequence, a payment procedure can also be initiated automatically, the price corresponding to the power class contained in the setting sequence.

This method enables a cost-effective and secure setting of the power after production and during installation of the inverter. The logistics can be simplified in this way.

In one development, in order to further increase safety, provision can be made for the inverter not to output electrical power without the setting of the power class.

In a further embodiment, it is advantageous that after the setting of the power class, the latter cannot subsequently be changed by the installer, but rather e.g. only by the manufacturer of the inverter.

In one embodiment, the setting sequence can be transmitted by way of a transmission device that is independent of a device used for the capturing in image form, e.g. from the control center to the inverter by way of remote data communication.

In one embodiment, the setting sequence is encrypted, in order to ensure secrecy, and/or signed, in order to ensure authenticity, before being communicated to the inverter. As a result, the inverter carries out an authentication of the communicated setting sequence. What is achieved as a result is that the setting sequence is accepted only by the envisaged inverter for the setting of a power class.

An inverter having a settable power class has a device type plate containing device-specific information of the inverter, which information is independent of the power class. The inverter furthermore has a class plate which is selected from a plurality of power class-specific class plates each assigned to one power class from the plurality of power classes and which contains information about the assigned power class. In one embodiment, the device type plate and the class plate are arranged on the inverter in such a way that they are jointly readable in image form. The inverter furthermore has a receiver configured to receive an encrypted and/or signed setting sequence having the information about the assigned power class. A controller of the inverter is configured to decrypt the encrypted setting sequence and/or to authenticate the signed setting sequence and to set the power class of the inverter on the basis of the setting sequence.

BRIEF DESCRIPTION OF THE DRAWINGS

The disclosure is described and explained in further detail below on the basis of example embodiments illustrated in the figures.

FIG. 3 schematically shows a device type plate and a plurality of class plates.

DETAILED DESCRIPTION

Figure 1:
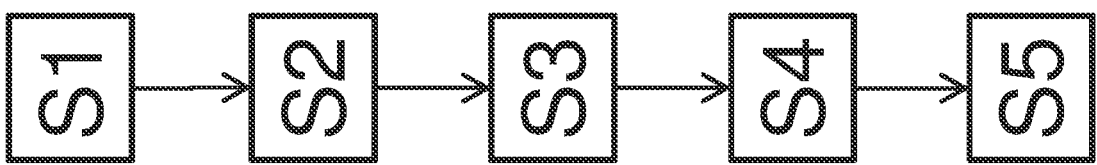
FIG. 1 schematically shows a method for setting a power class of an inverter.
Figure 2:
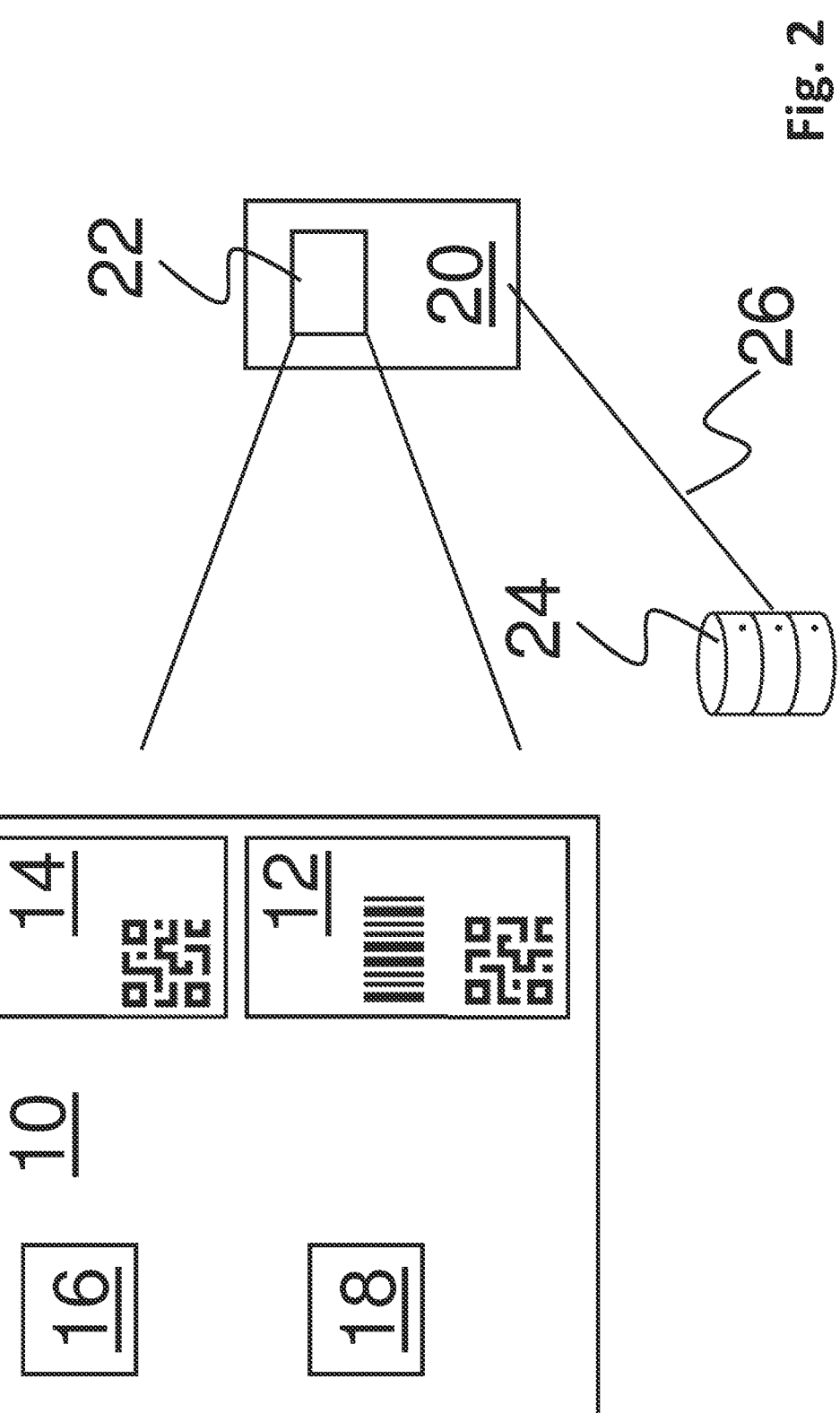
FIG. 2 schematically shows the inverter with a mobile device.

At S1 of FIG. 1, a class plate 14 (FIG. 2) is selected from a plurality of class plates 14.1, 14.2, 14.3, 14.4 (FIG. 2) and is attached to an inverter 10 (FIG. 2).

At S2 of FIG. 1, a device type plate 12 (FIG. 2) attached to the inverter 10 and the class plate 14 (FIG. 2) are captured in image form and device-specific information and information about the assigned power class are read out from the captured data, i.e. the captured image or the captured images.

At S3 of FIG. 1, the information read out is authenticated. In one embodiment, authenticating comprises checking whether there are preconditions for setting the power class of the inverter 10. This checking can include e.g. querying a database 24 arranged remotely from the inverter via remote data transmission 26. By way of example, the database query can determine whether payment has also been made for the power class specified on the class plate 14.

At S4 of FIG. 1, a setting sequence is communicated to the inverter 10, wherein the setting sequence has the information about the power class which is assigned to the inverter 10 and which is intended to be set.

At S5 of FIG. 1, the power class of the inverter 10 is set on the basis of the setting sequence.

FIG. 2 schematically illustrates an inverter 10 having a settable power class. The inverter 10 has a device type plate 12 containing device-specific information of the inverter 10, which information is independent of the power class. The inverter 10 additionally has a class plate 14 which is selected from a plurality of power class-specific class plates 14.1, 14.2, 14.3, 14.4 (FIG. 3), wherein each class plate 14 is assigned to one power class from the plurality of power classes and which contains information about the assigned power class. The device type plate 12 and the class plate 14 of the inverter 10 are readable in image form. The information of the device type plate is, in one embodiment, attached on the plates 12, 14 in the form of machine-readable image codes, such as e.g. barcodes or QR codes. Alternatively or additionally, the same information can be attached on the plates in human-readable form.

In one embodiment, the device type plate 12 and the class plate 14 are arranged on the inverter 10 such that they are jointly readable in image form. The inverter 10 has a receiver 16 configured to receive an encrypted and/or signed setting sequence having the information about the assigned power class. The inverter 10 has a controller 18 configured to decrypt the encrypted setting sequence and/or to authenticate the signed setting sequence and to set the power class of the inverter 10 on the basis of the setting sequence.

A mobile device 20 has a camera or reader device 22 configured to capture the data, for example, the image, associated with the device type plate 12 and the class plate 14 in image form, for example, to capture them jointly in image form. Codes, such as e.g. barcodes and/or QR codes, can be read out for this purpose. Alternatively or additionally, human-readable information can be captured and can be captured by a programmed circuit, e.g. by means of an app, of the mobile device 20. One example thereof is OCR (Optical Character Recognition) for text recognition.

The mobile device is connected to a database 24 via a remote data connection 26, e.g. mobile radio and/or the Internet. By way of the database, e.g. the information captured in image form can be authenticated and thus verified.

FIG. 3 schematically illustrates a device type plate 12 and a class plate 14 such as can be arranged e.g. on an inverter 10. If they are arranged in the manner illustrated, then they can be jointly read in image form, which accelerates the method and further increases the security of the method. The device type plate 12 contains device-specific information of the inverter 10, which information is independent of the power class. At S1 of the method (FIG. 1), the class plate 14 is selected from a plurality of class plates 14.1, 14.2, 14.3, 14.4. Each of the class plates 14.1, 14.2, 14.3, 14.4 is power class-specific, that is to say that it is assigned respectively to a power class to which the inverter 10 can be set. In one embodiment, the inverter 10 has an assigned class plate 14.1, 14.2, 14.3, 14.4 for each power class to which it is settable. In one embodiment, the plurality of class plates 14.1, 14.2, 14.3, 14.4 are enclosed with the delivery contents of the inverter, such that during installation that class plate which corresponds to the power class to be set can be selected and attached to the inverter 10.

The invention claimed is:

1. A method for setting a power class of an inverter, wherein the inverter comprises a device type plate containing device-specific information of the inverter, which information is independent of a selected power class, and wherein the inverter comprises a class plate selected from a plurality of power class-specific class plates, wherein each power class-specific plate is assigned to one power class from a plurality of power classes and contains information about the assigned power class, wherein the method comprises:

capturing in image form the device type plate and the class plate and reading out the device-specific information and the information about an assigned power class from data captured as an image, communicating a setting sequence to the inverter, wherein the setting sequence comprises the information about the assigned power class from the captured image format, authenticating the communicated setting sequence before setting the power class of the inverter, wherein, in the case of a successful authentication, the setting sequence is transmitted with an authentication section, an inverter identification section and a power class section to the inverter, wherein the inverter checks the authentication section and the inverter identification section before a power class contained in the power class section is set, and setting the power class of the inverter on the basis of the setting sequence after authentication of the information read out.

2. The method as claimed in claim 1, wherein the reading out in image format is preceded by selecting the class plate from a plurality of class plates and attaching the selected class plate to the inverter.

3. The method as claimed in claim 1, wherein the setting sequence, before being communicated to the inverter, is generated from the device-specific information and information about the assigned power class.

4. The method as claimed in claim 1, wherein the inverter comprises structures for preventing a manipulation of the class plate.

5. The method as claimed in claim 1, wherein the authenticating comprises capturing and checking information about a person conducting the capturing in image format.

6. The method as claimed in claim 1, wherein the authenticating comprises checking whether there are preconditions for setting the power class of the inverter.

7. The method as claimed in claim 6, wherein the authenticating comprises checking a state of structures in the captured image.

8. The method as claimed in claim 1, wherein the authenticating comprises a query of a database via a remote data connection.

9. The method as claimed in claim 1, wherein the capturing in image format and the transmitting of the setting sequence are effected by a smartphone.

10. The method as claimed in claim 1, wherein the setting sequence is transmitted by way of a transmission device that is independent of a device used for the capturing in image format.

11. The method as claimed in claim 1, wherein the setting sequence is encrypted and/or signed before being communicated to the inverter.

12. The method as claimed in claim 1, wherein communication of the setting sequence is effected after checking whether a combination of the device-specific information and the information about the assigned power class is a permissible combination.

13. An inverter with a settable power class, wherein the inverter comprises a device type plate containing device-specific information of the inverter, which information is independent of the power class, and wherein the inverter comprises a class plate selected from a plurality of power class-specific class plates, wherein each power class-specific plate is assigned to one power class from a plurality of power classes and contains information about the assigned power class, wherein the device type plate and the class plate are readable in an image format and wherein the inverter comprises a receiver configured to receive an externally authenticated setting sequence having the information about the assigned power class, and wherein the inverter comprises a controller configured to authenticate internally the externally authenticated setting sequence, wherein the externally authenticated setting sequence comprises an authentication section, an inverter identification section and a power class section, and wherein internally authenticating the externally authenticated setting sequence comprises the controller checking the authentication section and the inverter identification section before a power class contained in the power class section is set and setting the power class of the inverter on the basis of the setting sequence.

* * * * *